United States Patent [19]

Crosby et al.

[11] Patent Number: 4,970,019
[45] Date of Patent: Nov. 13, 1990

[54] PARTICULATE COMPOSITION CONTAINING BLEACH AND OPTICAL BRIGHTENER AND PROCESS FOR ITS MANUFACTURE

[75] Inventors: John Crosby, Lawrenceville; Joseph C. Richards, Robbinsville, both of N.J.

[73] Assignee: FMC Corporation, Philadelphia, Pa.

[21] Appl. No.: 263,314

[22] Filed: Oct. 27, 1988

[51] Int. Cl.$^5$ .................. C01B 15/04; C01B 15/043; C01B 15/10; C01B 31/24
[52] U.S. Cl. .................. 252/186.27; 252/186.25; 252/186.43; 423/415 P; 423/273
[58] Field of Search .................. 423/415 P, 272; 252/186.27, 186.43

[56] References Cited

U.S. PATENT DOCUMENTS

| 1,225,722 | 5/1917 | Schaidhauf . | |
|---|---|---|---|
| 1,225,832 | 5/1917 | Liebknecht . | |
| 1,669,997 | 5/1928 | Noll . | |
| 2,167,997 | 8/1939 | Reichert | 23/62 |
| 2,254,434 | 9/1941 | Lind et al. | 252/95 |
| 2,380,620 | 7/1945 | Walters | 23/62 |
| 2,541,733 | 2/1951 | Young | 23/63 |
| 3,122,417 | 2/1964 | Blaser et al. | 23/207.5 |
| 3,387,939 | 6/1968 | Reilly et al. | 23/207.5 |
| 3,463,618 | 8/1969 | Harris et al. | 23/315 |
| 3,677,697 | 7/1972 | Yanush | 23/62 |
| 3,773,678 | 11/1973 | Munday | 252/186 |
| 3,801,706 | 4/1974 | Sack | 423/421 |
| 3,860,694 | 1/1975 | Jawawant | 423/415 P |
| 3,951,838 | 4/1976 | Jayawant et al. | 252/99 |
| 3,977,988 | 8/1976 | Tokiwa et al. | 252/99 |
| 3,979,318 | 9/1976 | Tokiwa et al. | 252/186 |
| 3,984,342 | 10/1976 | Hall et al. | 252/186 |
| 4,018,874 | 4/1977 | Mollard | 423/415 P |
| 4,020,148 | 4/1977 | Mohr et al. | 423/415 P |
| 4,025,609 | 5/1977 | Matsunaga | 423/415 P |
| 4,075,116 | 2/1978 | Mesaros | 252/102 |
| 4,118,465 | 10/1978 | Malafosse | 423/415 P |
| 4,146,571 | 3/1979 | Will et al. | 423/415 P |
| 4,171,280 | 10/1979 | Maddox et al. | 252/186 |
| 4,409,197 | 10/1983 | Sugano et al. | 423/415 P |
| 4,526,698 | 7/1985 | Kuroda et al. | 252/99 |
| 4,764,302 | 8/1988 | Baker et al. | 252/186.28 |
| 4,857,223 | 8/1989 | Borrello | 252/186.31 |
| 4,900,468 | 2/1990 | Mitchell et al. | 252/186.28 |

FOREIGN PATENT DOCUMENTS

| 122277 | 8/1944 | Australia . | |
|---|---|---|---|
| 70711 | 7/1981 | European Pat. Off. | 423/415 P |
| 212947 | 12/1982 | German Democratic Rep. | 423/415 P |
| 0011210 | 6/1983 | Japan | 423/415 P |

*Primary Examiner*—Richard D. Lovering
*Assistant Examiner*—Joseph D. Anthony
*Attorney, Agent, or Firm*—R. E. Elden; R. L. Andersen

[57] ABSTRACT

A manufacturing process and composition is claimed for a composition of matter comprising sodium carbonate, sodium carbonate perhydrate, a fluorescent whitening agent and a diphosphonic acid. The process comprises incorporating the fluorescent whitening agent and diphosphonic acid into aqueous hydrogen peroxide, uniformly applying the hydrogen peroxide solution to particulate sodium carbonate to form a reaction mixture, urging water vapor from the surface of the reaction mixture and maintaining the temperature of the reaction mixture between about 35° C. and 80° C.

22 Claims, No Drawings

PARTICULATE COMPOSITION CONTAINING BLEACH AND OPTICAL BRIGHTENER AND PROCESS FOR ITS MANUFACTURE

The present invention is a particulate composition and process for preparing the composition. The composition comprises a detergent builder, a peroxygen bleach and a fluorescent whitening agent particularly suitable for formulating detergents by dry blending the ingredients.

Particulate bleach formulations prepared by dry blending result in a mix of bleaching particles, builder particles and additional component particles are known to have a tendency to separate on handling and storage. Thus, a dry bleach composition which originally might have bleach particles mixed with other particles in an uniform distribution therethrough can eventually have a varying concentration of these components in the container. Such separation occurs due to different densities, particle sizes, particle shapes, and the like. Upon consumer use of conventional component mixtures, a significantly varying bleach concentration may be obtained during use of the product.

Sodium carbonate perhydrate ("SCP") which is also commonly, but inaccurately, called sodium percarbonate, has been evaluated for a long time as bleach in detergent systems. Although it has the advantages of a high active oxygen content (over 15%), high solubility in water, relatively cheap raw materials and very low adverse environmental impact, SCP has never achieved the commercial acceptance of sodium perborate.

This lack of acceptance of SCP is because it is much less stable than sodium perborate. Solid SCP undergoes decomposition, with a loss of active oxygen at a substantially greater rate than the decomposition of sodium perborate under the same conditions. The elimination of impurities, such as heavy metals which catalyze the peroxygen decomposition reaction, decreases the rate of decomposition of aqueous SCP solutions, but does not solve the problem of instability for solid SCP.

Numerous solutions have been proposed in the literature for alleviating this problem of stability of solid SCP, but to date none have been entirely successful as they generally require coating the particles with sodium silicate, paraffin, sodium fluorosilicate or polymers to such an extent that the rate of solubility is severely depressed.

U.S. Pat. Nos. 4,171,280 and 4,260,508 teach that a noncaking bleach composition may be formed containing up to 6% active oxygen as SCP by spraying only sufficient hydrogen peroxide onto sodium carbonate particles to partially convert the sodium carbonate or sodium carbonate monohydrate to SCP. U.S. Pat. No. 4,260,508 teaches adding sodium phosphate to the composition as a stabilizer. Both patents teach against producing a compound containing more than 6% active oxygen and that an assay of less than 6% active oxygen (less than 40% SCP) is necessary to obtain satisfactory stability. The low assay also is critical to prevent product caking and product demixing in formulations. However, such a low assay while acceptable for a dry bleach is a great disadvantage for use in detergent formulations because of the added shipping costs, the cost of the added inert raw materials and the increased capital cost for the larger size equipment necessary to obtain desired throughput. Even more objectionable is that an assay of less than 6% restricts the compositions to very low levels of active oxygen.

Copending U.S. applications, Ser. No. 253,822 filed Oct.r6, 1988 and Ser. No. 254,063 filed Oct. 6, 1988 have overcome many of the prior art problems by providing a composition and process for a soda ash peroxygen carrier which has an active oxygen content and a high stability without the need of a coating. Such a product is ideal for preparing formulations by dry blending the solid particles.

It is well known that it is desirable to incorporate fluorescent whitening agents into detergent formulations to enhance the appearance of fabrics after washing. However, the usual recommended use rate of fluorescent whitening agents in detergent formulations is very low, generally 0.1% to 0.5% or 0.5% to 2% for concentrated detergent formulations having a recommended use rate of ¼ cup per load. This low use rate makes it difficult to mix a fluorescent whitener uniformly into a granular, dry blended detergent formulation. With dry blended detergent formulations demixing or separation of fluorescent whitening agent, dry peroxygen bleach and detergent builder particles is a major problem.

The invention provides a process for manufacturing a soda ash peroxygen carrier composition comprising incorporating into an aqueous solution of 50% to 80% by weight hydrogen peroxide, a bis(styryl)aromatic fluorescent whitening agent, a diphosphonic acid or salt having the formula

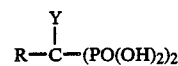

wherein Y is hydrogen or hydroxyl, R is hydrogen or an aliphatic hydrocarbon group having one to six carbons, to form a mixed solution, uniformly applying the mixed solution to a solid particulate reaction mixture initially comprising substantially anhydrous particles of sodium carbonate, concomitantly urging water vapor from the surface of the reaction mixture, maintaining the temperature of the reaction mixture between about 35° C. and 80° C., the fluorescent whitening agent being incorporated in an effective amount and the diphosphonic acid or salt being present in an effective amount to provide between 1 and 5 moles of sodium carbonate in the composition for each mole of available water in the composition.

Water vapor may be urged from the surface of the reaction mixture by reducing the pressure to less than the equilibrium water vapor pressure, or by urging an inert, unsaturated gas stream through or over the surface of the reaction mixture at a rate sufficient to remove sufficient water vapor to prevent condensation or substantial absorption.

The present invention overcomes the shortcomings of the prior art by providing a stabilized soda ash peroxygen carrier composition comprising a particulate solid, said particulate solid comprising sodium carbonate perhydrate, an effective amount of a bis(styryl)aromatic fluorescent whitening agent and 0.1% to about 3% by weight of a diphosphonic acid or salt having a formula of

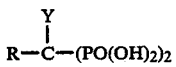

wherein Y is hydrogen or hydroxyl, R is hydrogen or an aliphatic hydrocarbon group having one to six carbons, sufficient sodium carbonate being present in the composition to provide between 1 and 5 moles of sodium carbonate for each mole of available water in the composition.

It is critical to provide sufficient sodium carbonate in the composition to be able to combine with all of the available water in the composition to form sodium carbonate monohydrate; tthe term "available water" includes water chemically available as hydrogen peroxide, water of crystallization of sodium carbonate hydrates and free water which may temporarily exist in the composition. The sodium carbonate in the composition also is particularly useful as a detergent builder in a detergent formulation.

As used herein, the term "particulate solid" ideally refers to particles substantially all of which comprise sodium carbonate, fluorescent whitening agent, SCP and stabilizer and excludes a physical mixture of separate particles of sodium carbonate, fluorescent whitening agent, stabilizer and SCP. Desirably, in a particulate solid a major proportion of the particles comprise sodium carbonate, SCP, fluorescent whitening agent and stabilizers, preferably 90% of the particles comprise sodium carbonate, SCP, fluorescent whitening agent and stabilizer.

Desirably, the assay of the composition will be between 45% and 75% by weight as SCP (between 14.6% and 24% as hydrogen peroxide or 7% and 10.6% active oxygen) and sufficient fluorescent whitening agent to provide 0.1% to 5% by weight in a detergent formulation. In general, the composition will contain 0.2% to 10% fluorescent whitening agent. Preferably the assay of the composition will be between 65% and 75% as SCP) between 21% and 24% H$_2$O$_2$ or 9% and 10.6% active oxygen). Unless indicated otherwise, all percentages used herein are rounded off to the nearest whole number or significant figure.

Further, it was found that the compositions were useful as a solid and storage stable source of peroxygen when formulated into detergent compositions. The compositions assaying between 45% and 75% SCP and 0.1% to 5% fluorescent whitening agent are particularly useful compounds in detergent formulations.

Unexpectedly it was found that the compositions were stable without the need for the coatings required by the prior art. It was further unexpectedly found that the compositions did not cake on storage in humid atmospheres even though the assay of the compositions was 45% to 75% SCP, even when the vapor pressure of water was substantially greater than the equilibrium vapor pressure of sodium carbonate monohydrate.

It was surprising that a fluorescent whitening agent could be incorporated into a sodium carbonate peroxygen carrier because of the inherent activity of the molecule as evidenced by its activation to an energized state by normal white light (fluorescence). It is well known that hydrogen peroxide reacts with nitrogen compounds to form nitrogen oxides, with double bonds to form either oxirane rings or dihydroxy groups and with aromatic rings to form phenols. Surprisingly it was found that a bis(styryl)aromatic compound could be dissolved in 50% to 70% hydrogen peroxide which is then reacted with alkaline sodium carbonate at 35oC to 80oC without decomposing the hydrogen peroxide and without being oxidized to a non-fluorescing compound. Although one skilled in the art will realize that any bis(styryl)aromatic compound suitable for use as a fluorescent whitening agent may be used in the sodium carbonate peroxygen carrier composition it is desirable for the compound to be 1,4-bis(styryl)benzene or 4,4'-bis(styryl)biphenyl or a derivative thereof. Preferred fluorescent whitening compounds are commercially available salts or free acids such as the compound sold under the tradename of Tinopal CBS-X brand of 4,4'-bis(styryl-2-sulfonic acid)bipyridyl disodium salt by Ciba Geigy company and 1,4-bis-(styryl-2-sulfonic acid)benzene disodium salt.

The incorporation of a stabilizer for the composition is critical to the invention. The stabilizer is known to be a chelating agent and is effective in preventing metals in water from being deposited on fabrics when incorporated into a detergent formulation. The stabilizer appears to prevent decomposition of aqueous solutions of the composition; more important the stabilizer appears to change the physical properties of the solid composition as measured by the equilibrium vapor pressure of sodium carbonate monohydrate, as well as the active oxygen stability on storage.

Clearly what "appears to be" sodium carbonate monohydrate and anhydrous sodium carbonate by the standard assays employed is an oversimplification. For the purpose of this invention we will describe the novel compositions as if they consisted of a simple mixture of SCP, anhydrous sodium carbonate, sodium carbonate monohydrate, sodium carbonate decahydrate, fluorescent whitening agent and a stabilizer. For clarity the novel composition is called a "Soda Ash Peroxygen Carrier", or simply SAPC.

A particularly desirable diphosphonic acid is a 1-hydroxyalkyl-1,1-diphosphonic acid which is commercially available. A typical example is sold under the tradename Dequest 2010 brand of 1-hydroxyethylidene-1,1-diphosphonic acid by Monsanto Chemical Co. in St. Louis, Mo. Surprisingly, it was found that the diphosphonic acid or salt appears to modify equilibrium vapor pressure the sodium carbonate monohydrate crystal permitting its dehydration under very mild conditions compared with the published data. This is wholly unexpected in view of the fact that diphosphonic acid is hygroscopic. On the other hand, the excess of anhydrous sodium carbonate in the SAPC still appears to be able to remove water present as sodium carbonate decahydrate by forming sodium carbonate monohydrate.

Any standard analytic method may be employed to analyze the soda ash carrier composition as follows:

Sodium Carbonate or Total Alkalinity (TA) may be determined by titrating with a standardized to a methyl orange endpoint and reported as % NaCO$_3$ (sodium carbonate).

Active Oxygen (AO) may be determined by titrating with a standardized potassium permanganate or ceric sulfate solution or determined iodometrically by titrating liberated iodine with standardized thiosulfate solution and alternatively reported as % AO, % H$_2$O$_2$, (2.125×% AO) or % SCP (6.542×% AO). The detailed procedures are conveniently described in FMC Corporation's Technical Bulletin 59, "The Analysis of Hydrogen Peroxide Solutions".

Water (% $H_2O$) may be determined conveniently by thermogravimetric analyses or by weight lost on standing over a dessicant at room temperature.

Available Water (% AW) can be determined gravimetrically by igniting a sample to about 200oC in a gas stream and measuring the increase in weight of a suitable absorbant, such as magnesium perchlorate, in the gas stream. Available water may be estimated as % $AW = \% H_2O + 0.529 \times \% H_2O_2$.

Fluorescent Whitening Agent (FWA) A qualitative test for a FWA is fluorescence of the SCPC under ultraviolet light. The relative concentration can be estimated quantitatively by measuring the intensity of fluorescence, of the solid or of a solution. The presence of an FWA can be determined qualitatively on white solids by visual observation.

The following example is presented to illustrate to one skilled in the art the best mode of practicing the invention and is not intended to be limiting. The stabilizers are exemplified in terms of the preferred commercial diphosphonic acid compound.

Laboratory samples of the SAPC were prepared by adding the desired quantity of a fluorescent whitening agent (FWA) and a diphosphonic acid (if any) into 70% by weight hydrogen peroxide to form a mixed solution. Anhydrous sodium carbonate was introduced into a laboratory rotary evaporator equipped with a waterbath for temperature control unless otherwise stated. The desired quantity of mixed solution of hydrogen peroxide, FWA and 1-hydroxyethylidene-1,1-diphosphonic acid was sprayed onto the soda ash to form a reaction mixture while mixing to ensure homogeneity and concomitantly water vapor was removed by applying by vacuum or by urging air over the surface of the reaction mixture. After the desired quantity of mixed solution was sprayed the reaction mixture was removed as product.

The humidity chamber stability was determined by placing a sample in a crystallizing dish in a humidity chamber at 40° C. and 80% relative humidity. The percent hydrogen peroxide was determined by iodometric titration and recorded over ten days. No corrections were made for the amount of water absorbed or lost in the samples.

The stability was also confirmed by differential scanning calorimetry (DSC) and by thermal gravimetric analysis (TGA).

EXAMPLE 1

A mixed solution was prepared by dissolving 0.02 parts by weight 4,4'-bis(styryl-2-sulfonic acid)bipyridyl disodium salt which is yellow in color, FWA and 1 part by weight 1-hydroxyethylidene-1,1-diphosphonic acid into 28 ml of hydrogen peroxide (as 70% aqueous solution). The mixed solution was applied over a 1 hour period to 100 g anhydrous sodium carbonate in a 1 liter round bottom flash and mixed via a Buchi Rotovapor-R. The final product assayed 18.24% $H_2O_2$ by iodometric titration. A slight uniform tinge of the FWA was observed on the product when viewed by light from ordinary fluorescent lights.

On exposure to 80% relative humidity at 40° C. for 10 days the sample assay was 16.4% $H_2O_2$ indicating a stability of 90%. In contrast, a sample containing no fluorescent whitening agent and no diphosphonic acid had a stability of only 16.5% under the same conditions.

An attempt to duplicate the example failed when using diethylenetriamine pentakis(methylenephosphonic acid) because the hydrogen peroxide solution decomposed immediately.

We claim:

1. A process for manufacturing a soda ash peroxygen carrier composition comprising incorporating into an aqueous solution of 50% to 80% by weight hydrogen peroxide a bis(styryl)aromatic fluorescent whitening agent, a diphosphonic acid or salt having a formula of

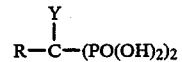

wherein Y is hydrogen or hydroxyl, R is hydrogen or an aliphatic hydrocarbon group having one to six carbons, to form a mixed solution, uniformly applying a mixed solution to a solid particulate reaction mixture initially comprising substantially anhydrous particles of sodium carbonate, concomitantly urging water vapor from the surface of the reaction mixture, maintaining the temperature of the reaction mixture between about 35° C. and 80° C., the fluorescent whitening agent being incorporated in an effective amount to provide 0.1% to 5.0% by weight when incorporated into a formulation, and the diphosphonic acid or salt being present in an effective amount to provide between 1 and 5 moles of sodium carbonate in the composition for each mole of available water in substantially all the particles in the composition, said available water including water chemically available as hydrogen peroxide, water of crystallization of sodium carbonate hydrates and free water whihc may temporarily exist in the composition.

2. The process of claim 1 wherein sufficient fluorescent whitening agent is incorporated into the hydrogen peroxide in an amount to provide 0.1% to 0.5% by weight into a detergent formulation.

3. The process of claim 1 wherein the fluorescent whitening agent is a bis(styryl)biphenyl fluorescent whitening agent.

4. The process of claim 2 wherein the fluorescent whitening agent is a bis(styryl)biphenyl fluorescent whitening agent.

5. The process of claim 1 wherein the fluorescent whitening agent is selected from the group consisting of 1,4-bis(styryl-2 sulfonic acid)benzene, 4,4-bis(styryl-2-sulfonic acid)bipyridyl or a salt thereof.

6. The process of claim 2 wherein the fluorescent whitenign agent is selected from the group consisting of 1,4-bis(styryl)-2-sulfonic acid) benzene and 4,4'-bis(-styryl)-2-sulfonic acid)bipyridyl and salts thereof.

7. A stabilized soda ash peroxygen carrier composition comprising a plurality of particles, substantially all of which particles comprise sodium carbonate perhydrate, an effective amount of a bis(styryl)aromatic fluorescent whitening agent to provide 0.1% to 5% by weight in a formulation and 0.1% to about 3% by weight of a diphosphonic acid or salt having a formula of

wherein Y is hydrogen or hydroxyl, R is hydrogen or an aliphatic hydrocarbon group having one to six carbons, sufficient sodium carbonate being present in the composition to provide between 1 and 5 moles of sodium carbonate for each mole of available water in the composition, said available water including water chemically available as hydrogen peroxide, water of crystallization of sodium carbonate hydrates and free water which may temporarily exist in the composition.

8. The composition of claim 7 wherein sufficient fluorescent whitening agent is present to provide 0.1% to 0.5% by weight fluorescent whitening agent in a formulation.

9. The composition of claim 7 wherein the fluorescent whitening agent is a bis(styryl)benzene.

10. The composition of claim 8 wherein the fluorescent whitening agent is a bis(styrl)benzene.

11. The composition of claim 7 wherein the fluorescent whitening agent is a bis(styryl)bipyridyl.

12. The composition of claim 8 wherein the fluorescent whitening agent is a bis(styryl)bipyridyl.

13. The composition of claim 7 wherein the fluorescent whitening agent is selected from the group consisting of 1,4-bis(styryl-2 sulfonic acid)benzene, 4,4-bis(styryl-2-sulfonic acid)bipyridyl or a salt thereof.

14. The composition of claim 8 wherein the fluorescent whitening agent is selected from the group consisting of 1,4-bis(styryl-2 sulfonic acid)benzene, 4,4-bis(styryl-2-sulfonic acid)bipyridyl and salts thereof.

15. The composition of claim 7 wherein the composition assays between 45% and 75% as sodium carbonate peroxide.

16. The composition of claim 8 wherein the composition assays between 45% and 75% as sodium carbonate peroxide.

17. The composition of claim 9 wherein the composition assays between 45% and 75% as sodium carbonate peroxide.

18. The composition of claim 10 wherein the composition assays between 45% and 75% as sodium carbonate peroxide.

19. The composition of claim 11 wherein the composition assays between 45% and 75% as sodium carbonate peroxide.

20. The composition of claim 12 wherein the composition assays between 45% and 75% as sodium carbonate peroxide.

21. The composition of claim 13 wherein the composition assays between 45% and 75% as sodium carbonate peroxide.

22. A stabilized soda ash peroxygen carrier composition comprising a "particulate solid", said particulate solid comprising sodium carbonate perhydrate, 0 2% to 10% by weight of a fluorescent whitening agent selected from the group consisting of 1,4-bis(styryl-2-sulfonic acid)benzene and 4,4'-bis(styryl-2-sulfonic acid)bipyridyl and salts thereof, and 0.1% to about 3% by weight of a diphosphonic acid or salt having a formula of

wherein Y is hydrogen or hydroxyl, R is hydrogen or an aliphatic hydrocarbon group having one to six carbons, sufficient sodium carbonate being present in the composition to provide between 1 and 5 moles of sodium carbonate for each mole of available water in the composition.

* * * * *

UNITED STATES PATENT AND TRADEMARK OFFICE
CERTIFICATE OF CORRECTION

PATENT NO. : 4,970,019

DATED : November 13, 1990

INVENTOR(S) : John Crosby and Joseph C. Richards

It is certified that error appears in the above-identified patent and that said Letters Patent is hereby corrected as shown below:

Column 2, line 4, "Oct.r6, 1988" should read --Oct. 6, 1988--.
Column 2, line 25, "a ma]or" should read --a major--. Column 4, lines 1-2, "at 35oC to 80oC" should read --at 35°C to 80°C--.
Column 5, line 5, "200oC in a gas" should read --200°C in a gas--. Column 6, lines 16-17, "a mixed solution" should read --the mixed solution--. Column 6, line 32, "water whihc" should read --water which--. Column 6, lines 45-46, "4,4-bis(styryl-2-sulfonic acid)bipyridyl or a salt thereof" should read --4,4'-bis(styryl-2-sulfonic acid)bipyridyl and salts thereof--.
Column 6, line 48, "whitenign agent" should read --whitening agent--. Column 6, line 49, "1,4-bis(styryl)-2-sulfonic acid)benzene" should read --1,4-bis(styryl-2-sulfonic acid)benzene--.
Column 6, lines 49-50, "4,4'-bis(styryl)-2-sulfonic acid)bipyridyl" should read --4,4'bis(styryl-2-sulfonic acid)bi-pyridyl--. Column 7, line 14, "bis(styrl)benzene" should read --bis(styryl)benzene--. Column 8, line 18, "0 2%" should read --0.2%--.

Signed and Sealed this

Thirtieth Day of June, 1992

Attest:

DOUGLAS B. COMER

Attesting Officer        Acting Commissioner of Patents and Trademarks